May 15, 1934.  F. A. THOMANN  1,959,070
COTTON HARVESTER
Filed March 7, 1932  6 Sheets-Sheet 1
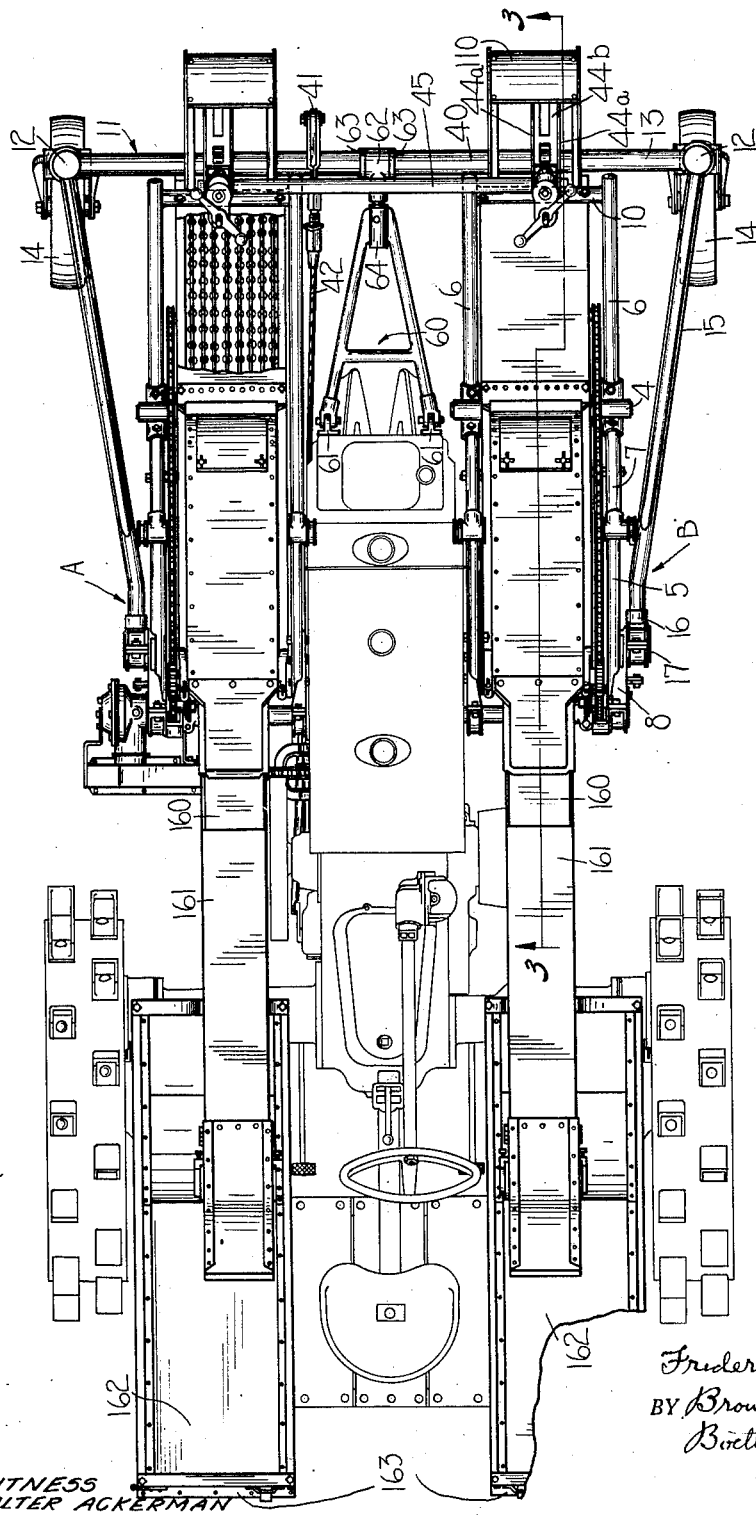

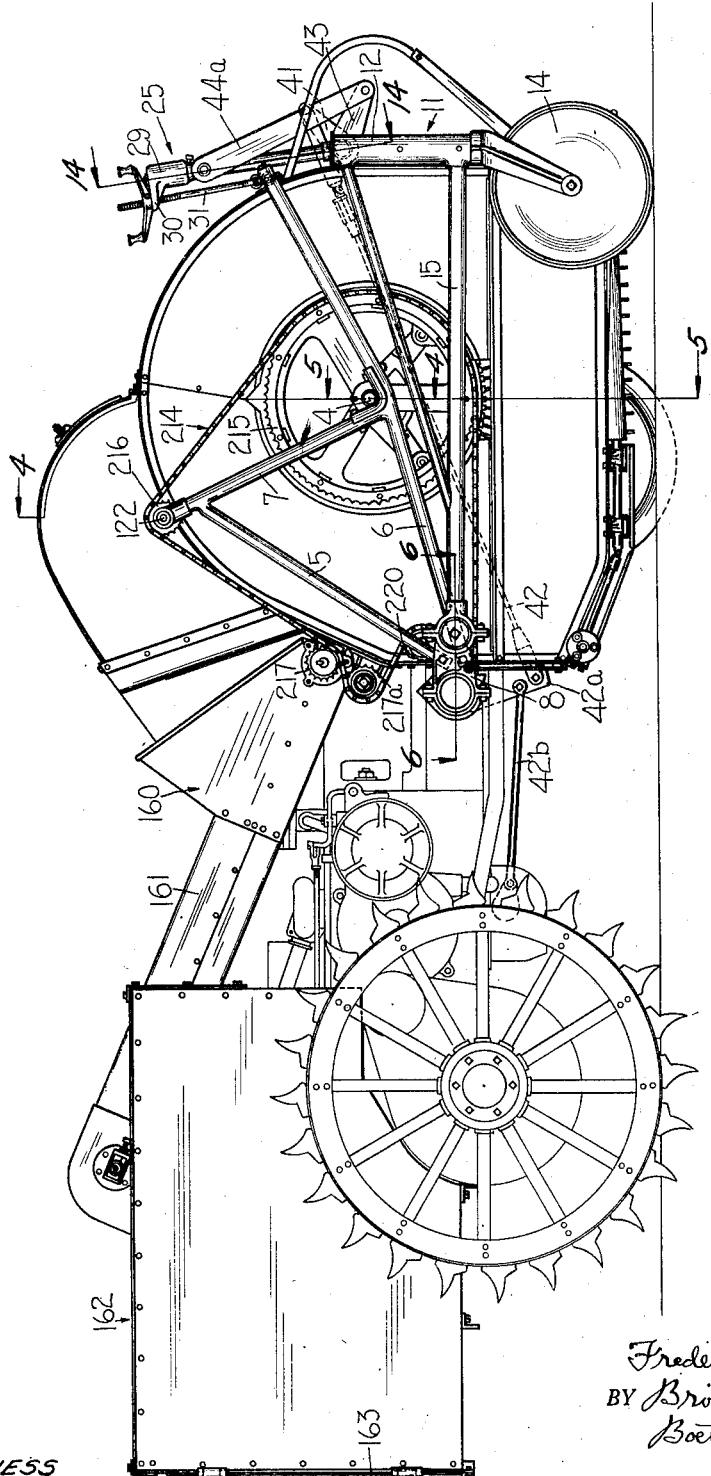

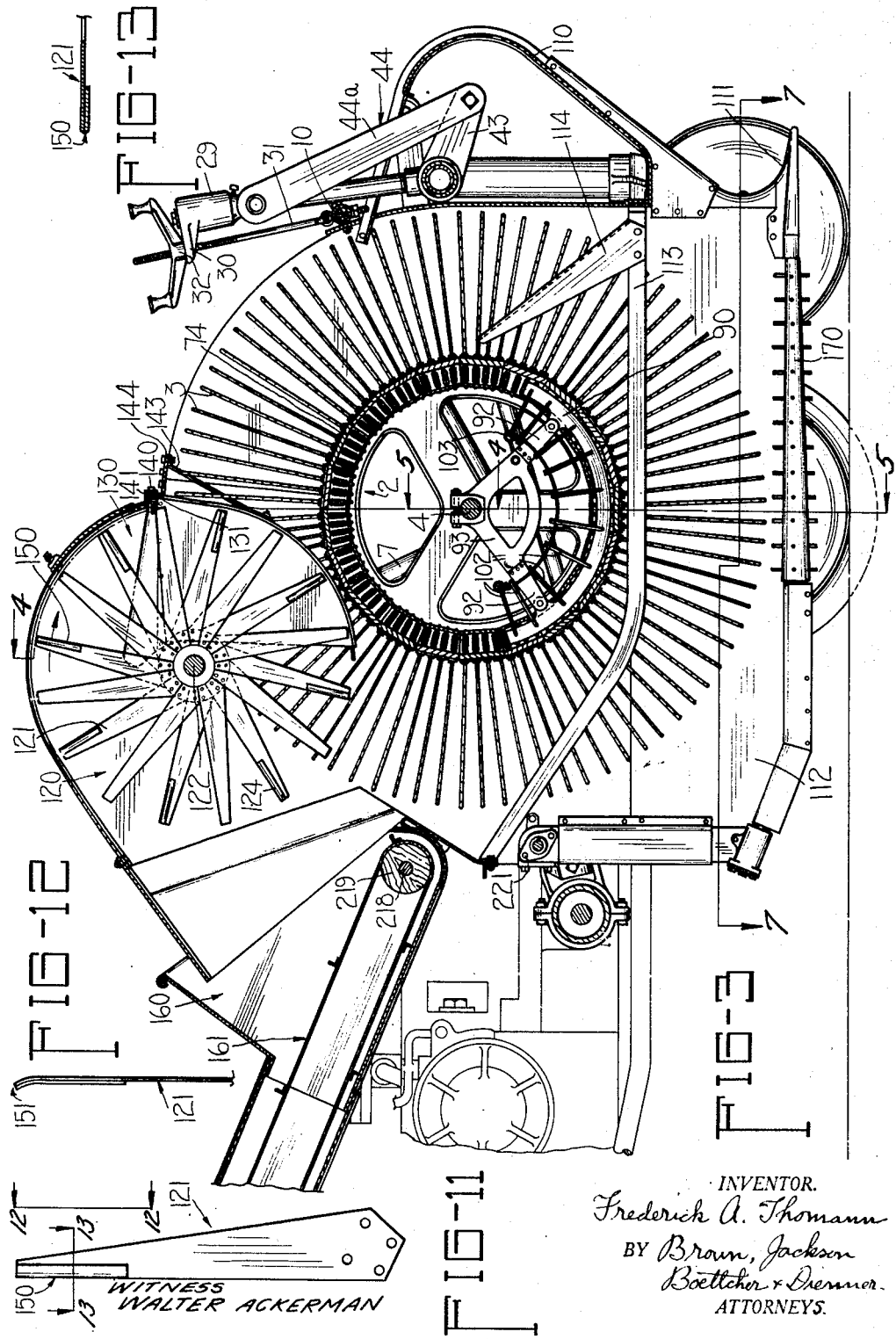

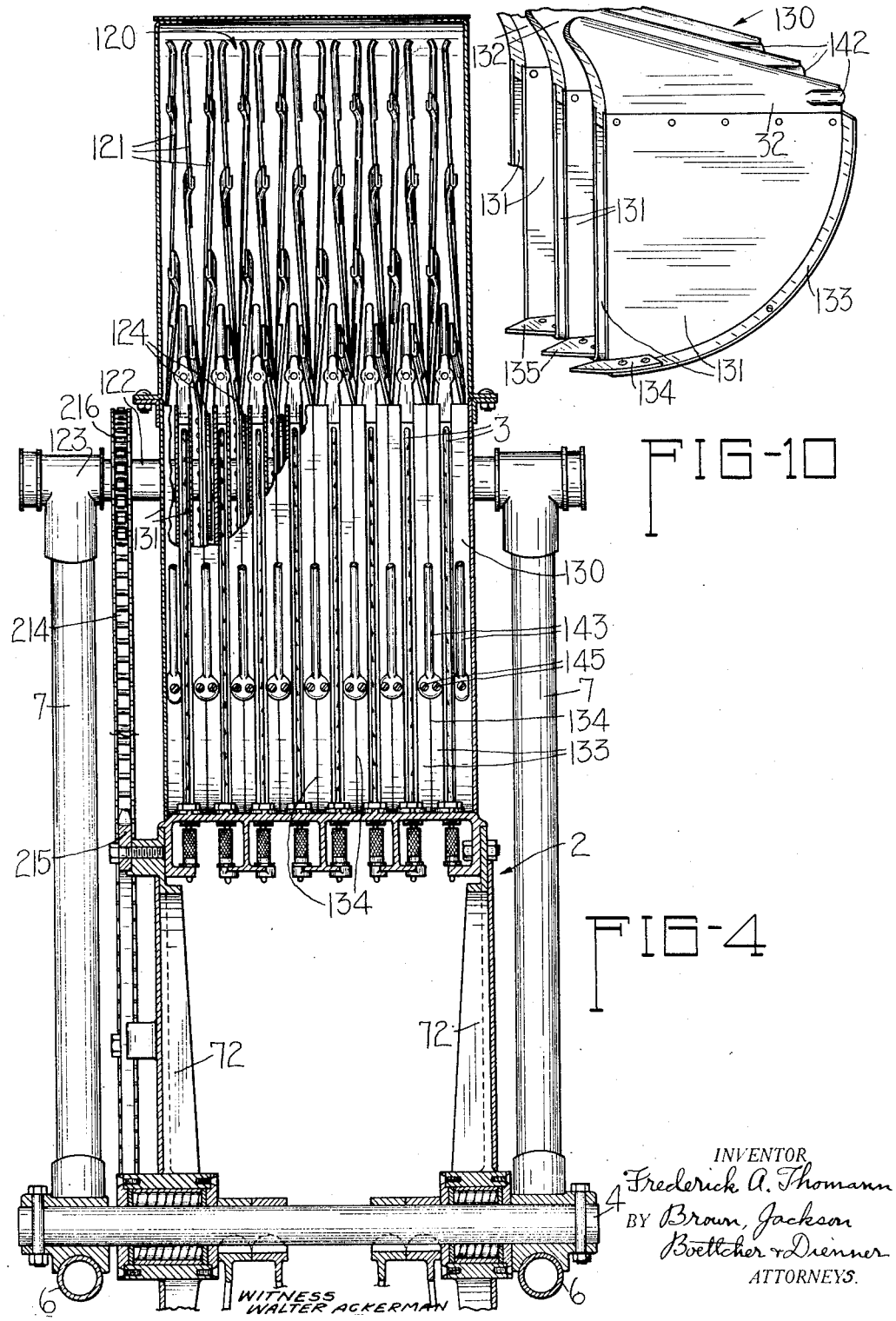

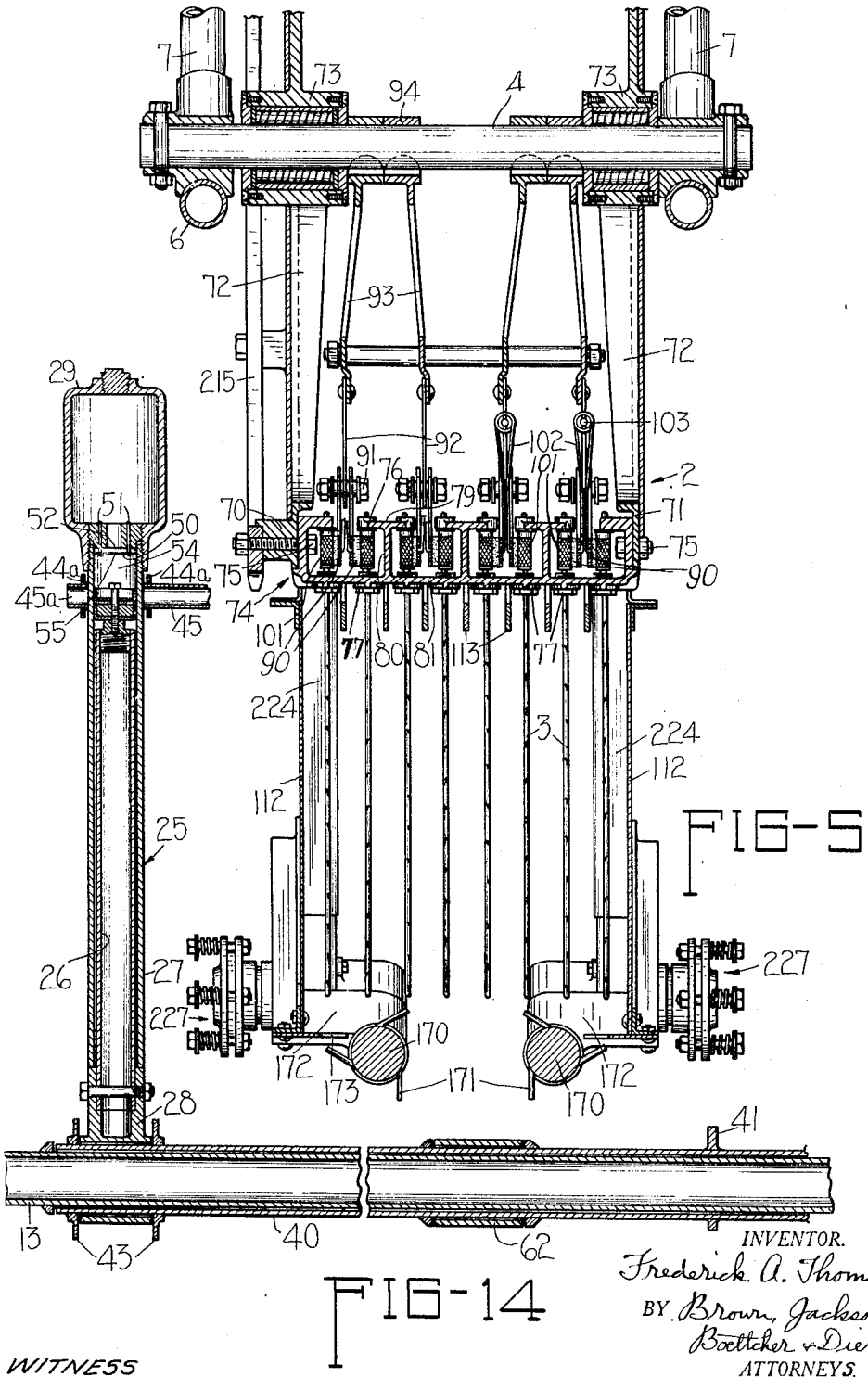

May 15, 1934.  F. A. THOMANN  1,959,070
COTTON HARVESTER
Filed March 7, 1932    6 Sheets-Sheet 6
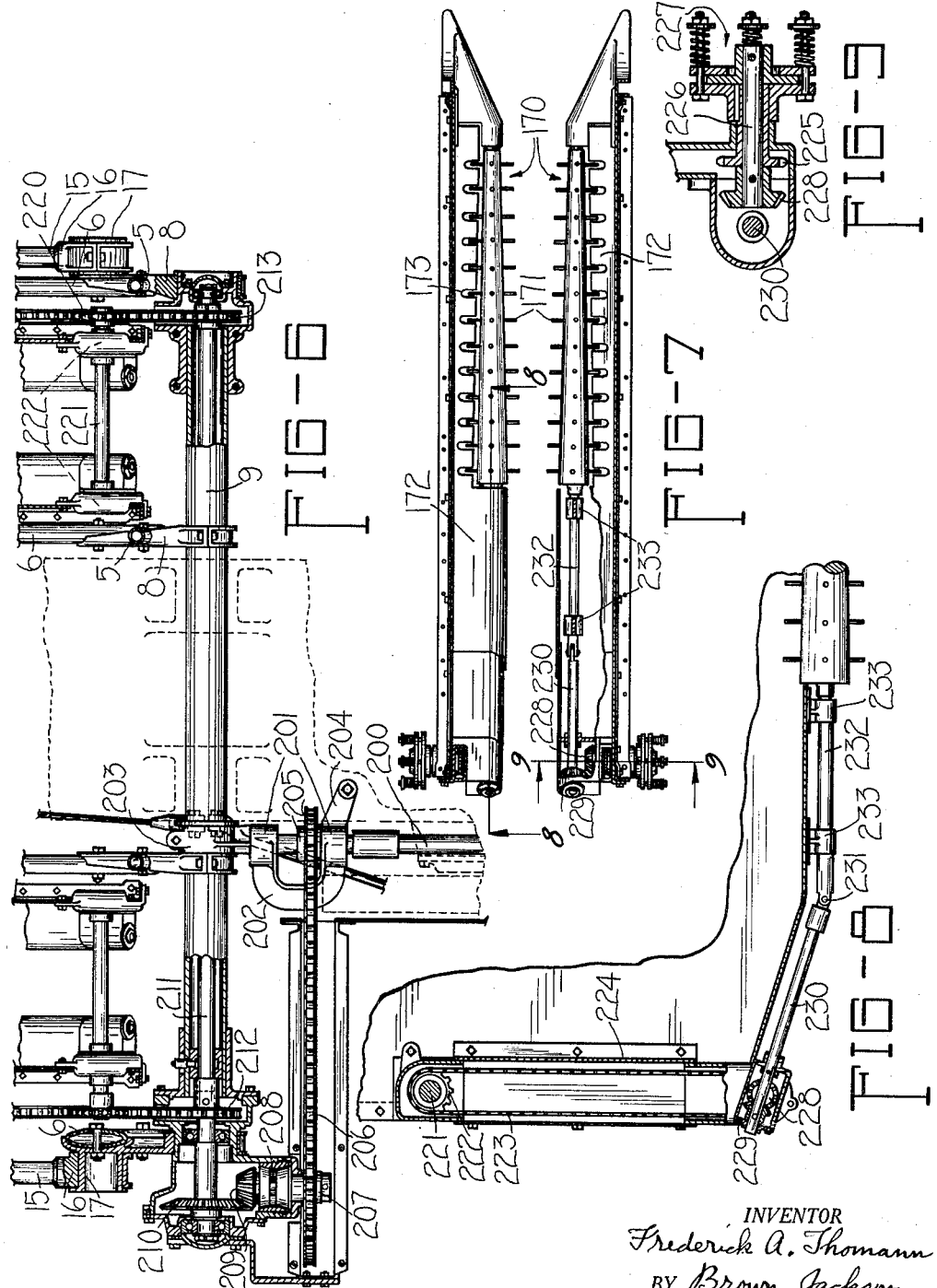
WITNESS
WALTER ACKERMAN
INVENTOR
Frederick A. Thomann
BY Brown, Jackson
Boettcher & Dienner
ATTORNEYS Patented May 15, 1934

1,959,070

UNITED STATES PATENT OFFICE 1,959,070

COTTON HARVESTER

Frederick A. Thomann, East Moline, Ill., assignor to Deere & Company, Moline, Ill., a corporation of Illinois Application March 7, 1932, Serial No. 597,212

28 Claims. (Cl. 56—14)

The present invention relates generally to cotton harvesters and is particularly concerned with the provision of a new and improved cotton harvester of the picking or needle type. More specifically, the present invention contemplates a harvester in which the picking mechanism comprises a drum having needles radiating therefrom, which drum is mounted on a horizontal axis and positioned above the plant row and rotated so that as the machine is advanced forwardly the needles are projected down into the plants.

In this type of agricultural machine, the present invention has for its principal object the provision of a new and improved supporting framework for the one or more picker units, particularly a type of framework which can be mounted upon a tractor of the general purpose type and in which the power lift may be utilized for raising and lowering the picking units toward and from their inoperative or transport position.

Another object of the present invention is to improve the rotary picking means by arranging the radially disposed picking needles in groups or sections which may be conveniently and easily removed from the picking drum supporting the rotatable needles. Thus, not only may any one or more sections be readily removed without disturbing the other needles, but also the picker unit may more readily be assembled during the manufacture thereof.

A further object of the present invention is to provide improved doffer means. Primarily, the doffer means of the present invention includes resilient doffer members movable in cooperative relation with the radial picker needles and which, at the proper time, are arranged to contact with and move radially outwardly of the picker needles to remove all of the cotton therefrom. In this connection it is another object of the present invention to provide a doffer means which is strong and sturdy in operation yet one which has the requisite flexibility to secure an efficient removal of the cotton from the picker needles.

The present invention also contemplates an improvement in the means for rotating the picker needles. Briefly this means comprises arcuate shoes which are resiliently mounted so as to compensate for any slight misalignment of the parts or any irregularities thereof in the manufacture or assembly. This feature is considered of importance in a machine of this character.

Another important feature of the present invention, particularly useful although not necessarily so in connection with a cotton harvester of the picker or needle type, is the provision of a plurality of rotatable members disposed underneath the rotary picker unit and operative to raise or lift up the cotton plants to bring them into the picking area or zone defined by the plurality of rotatable picking needles.

Still further, the present invention contemplates the provision of improved driving connections by which power from the tractor is delivered to the different operating parts of the various mechanisms forming a part of the machine, these including not only the picking and doffing mechanisms but also conveyor means driven from the power of the tractor and operative to receive the cotton from the doffing mechanism and to convey the same to hopper means disposed on or adjacent the tractor.

Other objects and advantages of the present invention will be apparent to those skilled in the art after a consideration of the following detailed description of the preferred structural embodiment, illustrated in the accompanying drawings, in which:

Figure 1 is a top plan view of a machine embodying the principles of the present invention;

Figure 2 is a side view of the machine shown in Figure 1;

Figure 3 is a fragmentary sectional view taken substantially along a vertical longitudinal plane and illustrating the relation between the picker mechanism, the doffer mechanism, and the conveyor means;

Figure 4 is a sectional view taken along the line 4—4 of Figure 3 and showing the doffer mechanism and the upper portion of the picker mechanism;

Figure 5 is a cross sectional view taken along the line 5—5 of Figure 3 and showing certain details of the lower rolls and the lower portion of the picking mechanism;

Figure 6 is a fragmentary detail view, partly in section and partly in elevation, showing the driving connections between the picker units and the power takeoff shaft of the tractor;

Figure 7 is a sectional view taken along the line 7—7 of Figure 3 and showing in detail the rolls for bringing the cotton plants up into the picking zone;

Figure 8 is a cross section taken along the line 8—8 of Figure 7 and showing the driving connections between the power shaft, which drives the picker units, and the lower rotatable rolls;

Figure 9 is a sectional view taken along the line 9—9 of Figure 7;

Figure 10 is a perspective view illustrating the guards or housings which prevent the doffing members from coming into contact with the picker needles until such time as they move radially outwardly along the needles;

Figures 11, 12 and 13 are detail views of one of the doffing members; and

Figure 14 is a section taken on the line 14—14 of Figure 2.

The structure shown in the drawings is a two-row tractor pushed machine comprising picking mechanisms A and B positioned on opposite sides of the tractor. Each picking mechanism comprises a drum 2 from which a plurality of picking needles 3 radiate. Drum 2 is journaled on a shaft 4 which is supported in two frame structures positioned on opposite sides of the drum. Each frame structure comprises members 5, 6 and 7. Members 5 and 6 terminate in a casting 8 which is journaled on a transverse pipe member 9 fixed to the under side of the tractor. The pipe 9 thus forms a substantially horizontal axis about which the frame structures supporting the picker drums pivot for vertical movement. The two frames 5—7 forming the framework for each individual picker unit are connected together at their front ends by means of a brace 10.

The front end of the two picking mechanisms are carried on a wheel supported frame 11 which comprises two vertical sleeves 12 connected together by means of a transverse pipe 13. A pair of caster wheels 14 are supported in these sleeves. Extending rearwardly from the spindles 12 are members 15 which terminate at their rear ends in castings 16 through which the supporting framework is journaled to spindles 17 formed integral with the castings 8.

The front ends of the picking mechanisms are supported from the pipe 13 through standards 25 shown in detail in Figure 14. These standards comprise two telescoping sections 26 and 27. The inner section 26 is fixed to a casting 28 journaled on pipe 40. The outer section 27 is provided with a cap 29 on its upper end having a rearwardly extending perforated lug 30. See Figures 2 and 3. A suspension link 31 is pivotally connected to the cross brace 10 at its lower end and extends up through the perforation in the lug 30. The upper end of link 31 is threaded and has a nut 32 threaded thereon which bears on the top surface of lug 30.

In order to raise and lower the front ends of the picker units by the power of the tractor, a pipe 40 is journaled on pipe 13 and is provided with an arm 41 which is connected by means of a cable 42, pendulum 42a and link 42b with the power lift mechanism of the tractor. Pipe 40 is also provided with a pair of arms 43 fixed thereto at each end, one for each picking mechanism. To the ends of each pair of arms 43 a link 44 is connected. Link 44 is built up of side members 44a and a connecting web 44b, see Figure 1. Links 44 are pivoted to the cross connecting member 45 which is rigidly connected to the upper end of the two sections 27 and to studs 45a welded to section 27 in line with member 45.

By the rotation of the pipe 40 through the actuation of the power lift mechanism, outer sections 27 of the standards 25 are moved vertically along the inner sections 26, as a result of which, through the suspension links 31, the picking mechanisms are raised or lowered. The distance that each picking mechanism operates from the ground surface is determined by the position of the screw 32 relative to the link 31.

To cushion the lowering operation of the picking mechanism, a check valve 50 has been provided in the head 29. Valve 50 is slidably supported on pins 51 so that it may leave its seat 52 over the opening 53 and move to the position shown in Figure 14. This is the position the valve assumes when the mechanism is being raised, at which time oil retained in the cavity of cap 29 passes down through the opening 53 and around the valve 50 into the cavity 54. When the mechanisms are lowered, the outer section 27 of each of the standards 25 is forced downwardly which causes valve 50 to seat itself upon its seat and the oil in the cavity 54 is forced through the small opening 55 in the center of the valve 50. The flow of oil into the upper cavity is thereby constrained so as to cause the mechanisms to be lowered gently.

The framework 11 is held in transverse alinement with the tractor through a connection therewith comprising A-shaped framework 60. This framework is pivotally connected to brackets 61 fixed to the forward end of the tractor. A casting 62 is pivotally mounted over pipe 40 between collars 63. Casting 62 is provided with a rearwardly extending pin which is journaled in sleeve 64 provided in the forward end of A-framework 60.

Turning now to specific details of the picker mechanism, the picker drum 2 comprises two wheel-like members having rims 70 and 71 integrally connected by means of spokes 72 with hubs 73 journaled on the shaft 4. Rims 70 and 71 are connected by a plurality of needle supporting sections 74 by means of bolts 75. In the illustrated embodiment there are twenty-one of these needle supporting sections but obviously, of course, the number of such sections may vary. Each section 74 supports a group of 32 needles, four needles of each of eight circumferential rows. The needles are journaled in section 74 in two bearings 76 and 77. Bearings 76 are pressed in perforated bosses 78 formed in arms 79 extending laterally from flange 80 extending inwardly from the needle supporting sections. Bearings 77 are screwed into threaded openings in the face 81.

The needles 3 are caused to rotate during the time they are within the plant. The mechanism for causing such rotation comprises arcuate shaped shoes 90 which are supported on bolts 91 which project through the perforated ears provided on shoes 90 and through perforations in the lower end of arms 92 which are riveted to the lower ends of arms 93. The arms 92 are formed of flexible or resilient stock to compensate for slight misalinement of the arms 93 as well as for irregularities in the drum itself. Arms 93 are provided with hub 94 by which they are supported and keyed to the shaft 4.

The inner ends of the needles are provided with knurled enlargements 101 between bearings 76 and 77. The shoes 90 are held in frictional engagement against these knurled portions by a number of coiled springs 102. See Figures 3 and 5. The springs for each pair of shoes are held in proper position by means of a wire 103 passed through the center of the coil of each spring.

In the operation of the machine, the picking mechanisms are guided over the rows of cotton. The inclined guide board 110 bends the plant over and in cooperation with hook members 111 guides the plant into the tunnel comprising two side plates 112 positioned adjacent the outer row of needles. The ceiling of this tunnel comprises a plurality of longitudinally extending bars 113 positioned between the rows of needles. These bars function to confine the plants within the tunnel and also serve to guide the needles into the cotton plants and by the action of the rotation of the needles, the cotton is picked therefrom. The bars 113 are curved upwardly at their rear ends at an angle such that the needles will leave the plants and be withdrawn therefrom with the least amount of strain on the needles.

To guide the needles between the proper bars 113, each bar is provided with a guide 114 which extends upwardly and rearwardly to a point near the base of the needles.

In the continued rotation of the drum 2, the needles, carrying cotton, come in contact with the doffing mechanism 120. As best shown in Figure 4, this mechanism comprises a series of doffing members 121 fixed on shaft 122. Shaft 122 is journaled in bearings 123 provided at the upper end of frame members 7. Shaft 122 is provided with a series of circumferential flanges 124 which are positioned in planes midway between the planes defined by the circumferential rows of picking needles. Doffing members 121 are riveted at their inner ends to these flanges. Adjacent members fixed to the same flange are offset slightly in opposite directions as best shown in Figure 4, so as to bring the ends of half of the members fixed to one flange and the ends of half of the members fixed to the adjacent flange nearly in the same plane with one of the rows of picking needles so that they will contact therewith and strip the cotton from the needles as the doffer is rotated. The doffing members are prevented from coming in contact with the needles until such time as they move outwardly along the needles by means which comprises a set of guards 130. These guards are shown in perspective in Figure 10 and consist of a plurality of pairs of quarter-circular plates 131, the two plates of each pair being positioned on opposite sides of a row of picking needles. The upper edges of the two plates of each pair are fixed to a casting 132, the upper edge of which is shaped to guide the doffing members between adjacent plates of adjacent pairs. A laterally extending flange or strip is provided along the curved edge 133 of each plate of each pair, extending in opposite directions with the edges of adjacent strips abutting as shown at 134 in Figure 4. Adjacent plates 131 of opposite pairs, together with the flanges 133 thus form enclosures in which the stripping members are guided until they are permitted to come in contact with the picking needles at the rear ends of the plates.

The picking needles enter between the two plates 131 of a pair at the lower corner thereof. To guide them in between proper plates, pointed guide members 135 have been provided. Each guide 135, except the two outside ones, are fixed to the two abutting flanges 133 and thus function to connect the pairs of plates together.

The guards 130 are supported by means of bolts 140 which extend through the frame member 141 and are screwed into the threaded borings provided in bosses 142 formed in the end casting 132. They are further supported by means of rods 143 which are connected to the frame member 144 and to adjacent flanges 133 by means of screws 145.

The stripping members 121 are formed of flexible sheet metal and shaped as shown in Figures 11, 12 and 13. The tip portion of the leading edge is bent back upon itself as shown at 150 to form a somewhat rounded surface for contacting with the picking needle. The tip of the doffing members are also bent laterally slightly as shown at 151 to prevent their striking directly against the needle. By reason of this formation of the doffing members they have the required flexibility laterally to exert the proper yielding pressure against the picking needles but are quite rigid against bending in the direction of their rotation.

As the doffing mechanism 120 is rotated in the direction indicated by the arrow, the cotton is removed from the needles by the rubbing action of the doffing members 121 against the two sides of the needles and is thrown back into the hopper 160 and onto the enclosed conveyor 161 by which it is conveyed rearwardly into the hoppers 162. Periodically the cotton is removed from the hoppers 162 through the hinged door 163 at the rear end thereof.

To aid the picking needles in obtaining cotton from the lower branches of the plants, a pair of rollers 170 have been provided which are mounted in a longitudinal position along the lower edges of the walls 112 underneath the picking drums 2. Rollers 170 are provided with a plurality of fingers 171 inclined backwardly as shown in Figure 5. Rollers 170 are rotated in the direction away from each other when viewed from above. The function of these rollers is to gather the lower branches up onto shelf 172 and into the picking area. Notices 173 have been provided in the forward end of shelf 172 to receive the fingers 171. Roller 170 with its fingers 171 are intended to bring the cotton stalks carrying the cotton up into the picking area where the cotton may be picked by the needles.

Power for operating the various parts of the picking mechanism is derived from the power take-off shaft of the tractor through a main drive shaft 200, see Figure 6, which is suitably connected to the splined end of the power take-off shaft at one end and is journaled in bearings 201 formed in a C-shaped casting 202. This casting is held rigidly through an arm 203 embracing and bolted to the pipe 9 and an arm 204 bolted to the under side of the tractor. Shaft 200 carries a sprocket 205 which is chain-connected by means of a chain 206 with a sprocket 207 fixed on the end of a shaft 208. A bevel gear 209 on shaft 208 meshes with a bevel gear 210 fixed to the end of shaft 211 which is journaled within the pipe 9. Shaft 211 carries a sprocket 212 at one end for driving the picking mechanism A and a sprocket 213 for driving the picking mechanism B.

The various parts of the picking mechanism B are driven from sprocket 213 by means of a chain 214. Chain 214 is trained over a large sprocket 215 bolted to the side of ring 70, see Figure 5, for rotating the drum carrying the picking needles. Chain 214 is also trained over a sprocket 216 fixed to one end of shaft 122 for driving the doffer 120. Chain 214 is also trained around the sprocket 217 fixed on the end of shaft 218 carrying the roller 219 at the lower end of the elevator or conveyor 161. Chain 214 is also trained around a sprocket 220 fixed on the outer end of a shaft 221 journaled in bearings provided at the upper rear corner of the walls 112 of the gathering tunnel. See Figures 3, 6 and 8. Shaft 221 carries two other sprockets 222 for driving the rolls 170. This drive includes a chain 223 enclosed in a housing 224. At its lower end chain 223 is trained over a sprocket 225, see Figure 9, which is journaled on a stub shaft 226. Power is delivered to shaft 226 through a slip clutch 227. A bevel gear 228 fixed on the inner end of shaft 226 meshes with a bevel gear 229 fixed on the end of the inclined shaft 230 which is connected by means of a universal joint 231 to shaft 232 carried in bearings 233 and connected to the rear ends of roller 170. To give chain 214 sufficient lap around sprockets 217 and 220, an idler sprocket 217a is provided.

While I have described above in detail the preferred structural embodiment for purposes of illustration, it is to be understood that my invention is not to be limited to the specific means shown and described but that, in fact, widely different means may be employed in the practice of the broader aspects of my invention.

What I claim, therefore, and desire to secure by Letters Patent is:

1. In combination, a tractor, an implement frame, a supporting frame, means adjustably supporting one end of the implement frame from one end of the supporting frame, ground engaging supports for one end of the supporting frame, and means pivotally connecting the opposite ends of said frames with the tractor for swinging movement relative to the tractor and relative to each other about substantially the same transverse axis.

2. A cotton harvester comprising a wheeled main frame, a second frame pivotally connected with said main frame for vertical swinging movement relative thereto, cotton picking and conveying mechanisms associated with said swingable frame, and means for driving said picking and conveying mechanism comprising a drive member carried by said main frame substantially upon the axis of the pivotal connection between said frames, driven members connected with each of said picking and conveying mechanisms, respectively, and means for connecting all of said driven members with said drive member.

3. A cotton harvester comprising, in combination, a tractor, plant stripping mechanism, a supporting framework for said mechanism pivotally supported at its rear end on the tractor, ground engaging supporting wheels for the forward end of said stripper supporting framework, means supporting the rear end of said plant stripping mechanism adjacent the rear of said supporting framework, and means adjustably suspending the forward portion of said stripper mechanism on the front end of said supporting framework.

4. A cotton harvester comprising, in combination, a tractor, a transverse member carried thereby, a stripper supporting framework including a forward transverse bar and a plurality of generally longitudinally extending bars, the rear ends of the latter being pivotally connected with said transverse member, stripping mechanism including a stripper frame pivoted to said transverse member, means for adjustably suspending the forward end of said stripper frame from said forward transverse member, and means for driving the stripper mechanism from the power of said tractor.

5. A cotton harvester comprising, in combination, a tractor, a transverse member carried by said tractor substantially midway thereof, a substantially rectangular stripper framework pivotally connected at its rear end to said transverse member for vertical movement about a horizontal axis, cotton stripping mechanism supported by said stripper framework and adapted to be driven from the motor of the tractor, and a wheeled supporting frame including a pair of spaced rearwardly extending members pivotally connected with said rectangular stripper frame and a forward transverse member connecting said rearwardly extending members, and means carried by said forward transverse member for adjustably supporting the forward ends of said rectangular stripper framework.

6. A cotton harvester comprising, in combination, a tractor, a pair of stripping units pivotally supported at their rear ends on said tractor, a wheeled supporting frame for the front ends of said stripper units, said wheeled supporting frame comprising rearwardly extending bars supported by the tractor and a transverse bar connecting said rearwardly extending bars and disposed forward of said stripper units, a pair of standards extending in a generally upward direction and disposed adjacent the forward ends of said stripper units, respectively, and means adjustably supporting the front ends of said units on said standards.

7. A cotton harvester comprising, in combination, a tractor, a transverse member carried by said tractor, a pair of stripper units disposed on opposite sides of said tractor and pivotally supported at their rear ends on said transverse member, a wheeled supporting frame for the forward ends of said stripper units including a forward transverse bar, a pair of extensible standards carried by said forward transverse bar, each standard including relatively movable members, means connecting the front end of each of said stripper units to one of said movable members, means for raising and lowering the stripper units relative to said transverse bar, and means associated with each of said standards for cushioning the descent of said stripper units.

8. A cotton harvester comprising, in combination, rotary picker mechanism including a plurality of radiating needles, means for successively inserting said needles into and withdrawing them from cotton plants, doffing mechanism for removing cotton from said needles comprising a plurality of cooperating sets of radially projecting resilient doffing members movable outwardly along and in contact with said radiating needles, said doffing members of each cooperative set being disposed in staggered relation for alternate engagement with the opposite sides of each of the needles coming in contact therewith, and means for driving said picker mechanism and said doffing members.

9. A cotton harvester comprising, in combination, a wheeled supporting frame, a picker drum including a plurality of rotatable radiating needles adapted to be inserted into and withdrawn from cotton plants to remove the cotton therefrom, doffing mechanism comprising a plurality of radially disposed doffing members movable about an axis spaced from the axis of said picker drum, said doffing members being flexible to exert a yielding pressure against said radiating needles but rigid against deflection in a circumferential direction, and housings to receive said picking needles during a portion of their circuit to prevent said doffing members from contacting therewith until said members can move radially outwardly with respect to said needles.

10. A doffer for rotary picker mechanism comprising a plurality of radially disposed doffing members, each member comprising a flat strip flexible laterally but rigid in the direction of rotation, a shaft for supporting said members, and hub means secured to said shaft and serving as a support to which said doffing members are secured.

11. A cotton harvester comprising a wheeled supporting frame, a transverse shaft fixed thereto, a picker drum rotatably mounted on said shaft, a plurality of radially disposed needles journaled for rotation in said drum, and means for rotating said needles as said drum rotates comprising arms fixed to said shaft, arcuate needle engaging shoes disposed adjacent the rear ends of said needles and adapted to contact therewith, and means loosely connected with said arms to support said shoes for independent movement relative to said arms.

12. A cotton harvester comprising, in combination, a wheeled supporting frame, a picker drum journaled for rotation on said frame, a plurality of radiating needles supported for rotation about radial axes on said drum, knurled enlargements formed on the radially inner journaled ends of said needles, a plurality of stationary shoes arranged to contact with said knurled enlargements as the picker drum is rotated, means slidably connected with said arms to support said shoes for lateral movement relative to said arms, and means for maintaining said shoes in contact with the knurled enlargements of said needles.

13. A cotton harvester comprising a wheeled supporting frame, picker mechanism carried thereby including needle means insertable downwardly into and retractable upwardly from the cotton plants, and a plurality of generally longitudinally extending spaced apart members carried by said frame substantially beneath said needle means and operative to lift plants to be engaged by said needle means.

14. A cotton harvester, comprising, in combination, a wheeled supporting frame, a rotary picker mechanism mounted on said frame and adapted to engage the cotton plants from above, and a plurality of rotatable members disposed underneath said picker mechanism and operating in conjunction therewith to bring the plants into substantially upright position to be engaged by said picker mechanism.

15. A cotton harvester, comprising, in combination, a wheeled supporting frame, a rotary picker mechanism including a picker drum rotatably supported on said frame and having a plurality of radially disposed rotatable needles, means for guiding plants into engagement with said needles, and a pair of rotatable members disposed underneath said picker drum and adjacent each side thereof for lifting plants upwardly into position to be engaged by said rotating needles.

16. A cotton harvester comprising, in combination, a tractor, a transverse member carried thereby, a rotary picker mechanism including a frame supported at its rear end on said transverse member, means for supporting the forward end of said rotary picking mechanism including means for guiding plants thereto, a pair of rotatable rolls disposed underneath said picker mechanism and spaced apart to receive plants therebetween, said rotatable rolls operating to force the plants upwardly into the picking area defined by said picker mechanism, and means for driving said picker mechanism and said rolls from the motor of the tractor.

17. A cotton harvester comprising, in combination, a tractor, a transverse member carried by said tractor and extending laterally therefrom, a pair of picker units supported at their rear ends on said transverse member, each of said units including a rotary picker, a picker frame therefor including rearwardly extending frame bars pivotally supported on said transverse member and doffing mechanism carried by said picker frame, conveyor mechanism adapted to receive the cotton from said doffing mechanism, and means for driving the doffing mechanism and picker mechanism from the tractor, said means comprising a transverse power shaft journaled on said tractor supported transverse member, driving sprockets thereon, driven sprockets for each of said picker mechanisms, doffer mechanisms, and the conveyor mechanism, and sprocket chains trained, respectively, around the sprockets of said power shaft and the sprockets on said conveyor means, doffing mechanisms and picker mechanisms.

18. A cotton harvester comprising, in combination, a tractor, a transverse member carried thereby, plant stripping mechanism pivotally connected with said transverse member, a supporting framework for said mechanism including longitudinally disposed bars, means including said transverse member for supporting the rear ends of said bars on the tractor, ground engaging supporting wheels for the forward end of said stripper supporting framework, and means reacting against the forward portion of said supporting framework and connected with the forward portion of said stripping mechanism for raising and lowering said stripping mechanism relative to the supporting frame and said tractor.

19. A cotton harvester comprising, in combination, a tractor, plant stripping mechanism, a supporting framework for said mechanism pivotally supported at its rear end on the tractor, ground engaging supporting wheels for the forward end of said stripper supporting framework, and means for raising and lowering said stripper mechanism relative to said supporting framework including extensible members comprising means for cushioning the descent of said mechanism during the lowering thereof.

20. A cotton harvester comprising a wheeled main frame, a second frame pivotally connected with said main frame, means for supporting the free end of said second frame at a predetermined distance above the ground, plant stripping mechanism connected with said second frame and movable relative thereto, means for raising and lowering said mechanism relative to said second frame, and means reacting against said second frame for cushioning the descent of said stripping mechanism during the lowering thereof.

21. A cotton harvester comprising a wheeled main frame, a second frame pivotally connected with said main frame for vertical swinging movement relative thereto, plant stripping mechanism associated with said second frame, means for driving said mechanism comprising a drive shaft journaled for rotation on the axis of the pivotal connection between said frames and in fixed relation to said main frame, a driven member carried on said second frame and connected with said stripping mechanism to drive the same, means connecting said drive member with said driven member, and means connecting said frames to allow relative vertical swinging therebetween but preventing relative lateral movement therebetween to maintain said driving means in operative alinement with respect to said two frames and the stripping mechanism.

22. A cotton harvester comprising a wheeled main frame, a second frame pivotally connected with said main frame for vertical swinging movement relative thereto, cotton picking and conveying mechanisms associated with said swingable frame, and means for driving said picking and conveying mechanism comprising a drive member carried by said main frame substantially upon the axis of the pivotal connection between said frames, driven members connected with each of said picking and conveying mechanisms respectively, and a single chain member for connecting all of said driven members with said drive member.

23. A cotton harvester comprising, in combination, rotary picker mechanism including a plurality of sets of radiating needles, means for successively inserting said needles into and withdrawing them from the cotton plants, and doffing mechanism for removing cotton from said needles comprising cooperative sets of radially projecting doffing members, the laterally adjacent members of each of said sets of doffing members having their inner ends disposed substantially midway between the median planes of the sets of needles and being inclined laterally to dispose the outer ends of said adjacent members substantially in the median plane of the sets of needles.

24. A cotton harvester comprising, in combination, rotary picker mechanism including a plurality of sets of radiating needles, means for successively inserting said needles into and withdrawing them from the cotton plants, doffing mechanism for removing cotton from said needles comprising cooperative sets of radially projecting doffing members, the laterally adjacent members of each of said sets of doffing members having their inner ends disposed substantially midway between the median planes of the sets of needles and being inclined laterally to dispose the outer ends of said adjacent members substantially in the median plane of the sets of needles, and means on the doffing members to prevent the latter from striking the needles.

25. A cotton harvester comprising, in combination, rotary picker mechanism including a plurality of sets of radiating needles, means for successively inserting said needles into and withdrawing them from the cotton plants, and doffing mechanism for removing cotton from said needles comprising cooperative sets of radially projecting doffing members, the laterally adjacent members of each of said sets of doffing members having their inner ends disposed substantially midway between the median planes of the sets of needles and being inclined laterally to dispose the outer ends of said adjacent members substantially in the median plane of the sets of needles, said doffing members of each cooperative set being staggered circumferentially to alternately engage the needles at the opposite sides thereof.

26. In combination with a cotton harvester having a revolving picker drum including a plurality of needles journaled for rotation in said drum, means for rotating said needles as the drum rotates comprising a fixed member, a plurality of shoes for contacting said needles, and relatively movable cooperative means carried by said fixed member and shoes respectively to support the shoes for self adjustment with respect to the needles.

27. In combination with a cotton harvester having a revolving picker drum including a plurality of needles journaled for rotation in said drum, means for rotating said needles as the drum rotates comprising a fixed member, a pair of shoes for contacting adjacent sets of needles, bolt means carried by said fixed member, and means slidably connected with said bolt means to support said pair of shoes for movement relative to said fixed member whereby said shoes may automatically aline themselves with the needles.

28. In combination with a cotton harvester having a revolving picker drum including a plurality of needles journaled for rotation in said drum, means for rotating said needles as the drum rotates comprising a fixed member, a plurality of shoes for contacting said needles, flexible means for supporting said shoes from said fixed member, and resilient means for suspending said shoes from said flexible supporting means including means for urging said shoes into operative engagement with said needles.

FREDERICK A. THOMANN.